United States Patent [19]

Salomonsson et al.

[11] 3,852,961
[45] Dec. 10, 1974

[54] HEAT EXCHANGER PRE-HEATING COMBUSTION AIR IN A STIRLING CYCLE ENGINE

[75] Inventors: Nils Arvid Salomonsson, Landskrona; Bo Goran Torsten Torstensson, Bara, both of Sweden

[73] Assignee: Kommanditbolaget United Stirling (Sweden) AB & Co., Malmo, Sweden

[22] Filed: Feb. 16, 1973

[21] Appl. No.: 333,391

[30] Foreign Application Priority Data
Feb. 19, 1972 Great Britain .................. 7801/72

[52] U.S. Cl. .................................. 60/517, 60/685
[51] Int. Cl. ............................................ F02g 1/04

[58] Field of Search ............... 60/24, 517, 521, 524; 62/6; 123/122 D

[56] References Cited
UNITED STATES PATENTS
3,085,558  4/1963  Sarto ........................... 123/122 D
3,180,078  4/1965  Liston ................................. 60/526

Primary Examiner—Edgar W. Geoghegan
Assistant Examiner—H. Burks, Sr.
Attorney, Agent, or Firm—Laurence R. Brown

[57] ABSTRACT

A Stirling cycle engine has a heat exchanger located between two combustion chambers to pre-heat combustion air by means of exhaust gases flowing through the heat exchanger.

5 Claims, 4 Drawing Figures

HEAT EXCHANGER PRE-HEATING COMBUSTION AIR IN A STIRLING CYCLE ENGINE

This invention relates to a multi-cylinder hot gas engine of the kind (herein called "the kind defined") comprising two or more burner units mounted in at least two combustion chambers arranged at opposite sides of a vertical plane extending parallel to or containing the axis of rotation of a crank-shaft of the engine.

Hot gas engines of the kind defined have been provided with pre-heaters for the combustion air located at one or both sides of the engine or at one of the ends of the engine.

The present invention is intended to provide an improved hot gas engine of the kind defined which is compact, in which heat losses may be kept small, and in which the pre-heating system is easy to inspect and service.

The invention is based upon the fact that the combustion chambers in the engines of the kind defined are generally of increasing dimensions in the direction from the place of the fuel injection.

According to the invention there is provided an engine of the kind defined characterized in that a heat-exchanger for heating combustion air by means of the exhaust gases is mounted between said combustion chambers.

Figure 1:
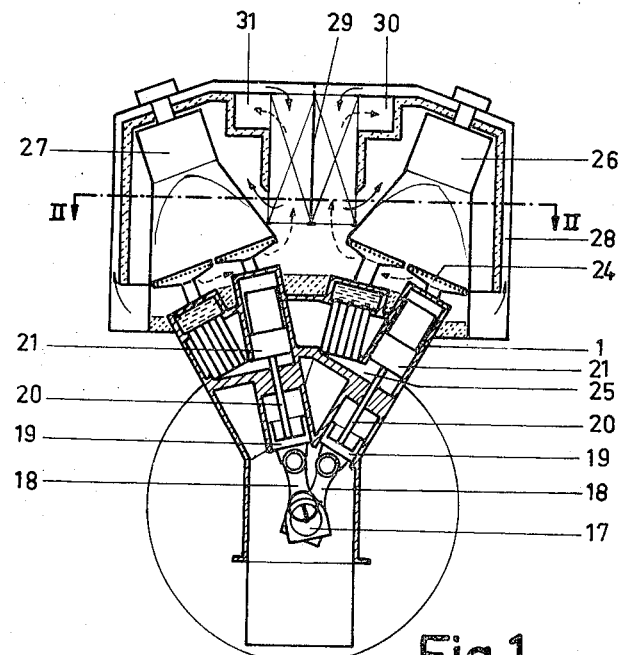
Figure 2:
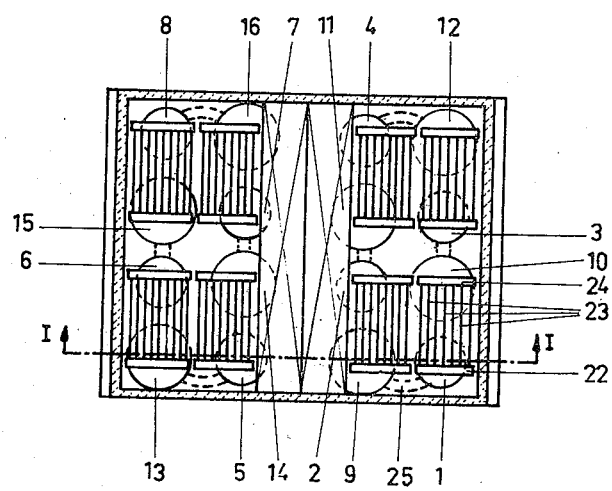
Figure 3:
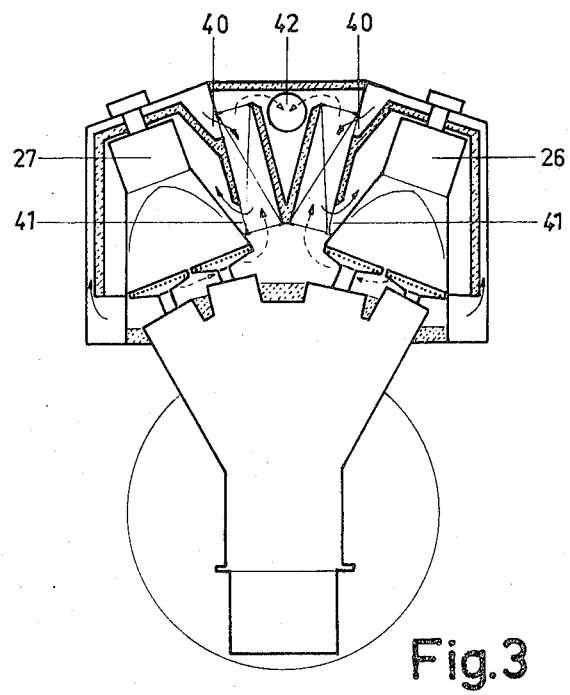
Figure 4:
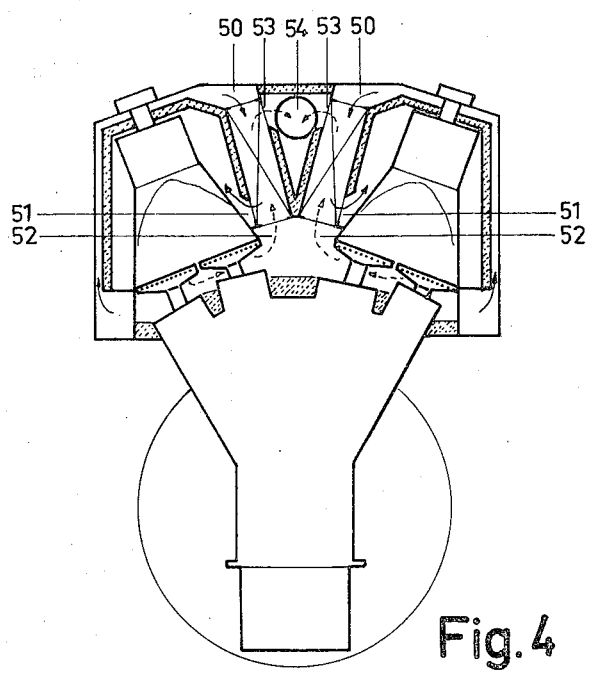

The scope of the monopoly sought is defined in the Claims hereinafter, and how the invention may be put into practice is described in more detail with reference to the accompanying drawings, in which FIG. 1 schematically shows a vertical section of an engine according to the invention, the section being taken along the line I-I of FIG. 2, FIG. 2 shows a section along the line II—II of FIG. 1, FIG. 3 shows a vertical section through another engine according to the invention, and FIG. 4 shows a vertical section through a third engine according to the invention.

Referring first to FIGS. 1 and 2, the hot gas engine shown is of the W-configuration comprising four rows of cylinders and regenerator-cooler units. The row to the extreme right in FIGS. 1 and 2 comprises cylinders 1 and 3 and regenerator-cooler units 10 and 12. The engine comprises eight cylinders 1 to 8 and eight regenerator-cooler units 9 to 16. The cylinders and regenerator-cooler units are arranged in rows in the longitudinal as well as in the transverse direction of the crank-shaft axis, with alternating cylinders and regenerator-cooler units in each row.

The engine is of the double-acting type having a single crank-shaft 17 acted upon by connecting rods 18 pivotally connected to cross-heads 19 rigidly secured to piston rods 20 connected to pistons 21.

The working space located above the piston 21 in the cylinder 1 is connected through a manifold 22 and a plurality of horizontally-extending pipes 23 to a manifold 24 connected to the top of the regenerator-cooler unit 10. The working space below the piston 21 in the cylinder 1 is connected to the lower end of the regenerator-cooler unit 9 through a cold gas connecting duct 25. The top of the regenerator-cooler unit 9 is connected to the top of cylinder 2 through a number of parallel pipes, the top of the regenerator-cooler unit 11 is connected to the top of cylinder 4, and the top of cylinder 3 is connected to the top of regenerator-cooler unit 12.

The cylinders 1 to 4 are connected to the crank-shaft at 90° difference. The said cylinders 1 to 4 will thus divide four separate charges of working gas (hydrogen or helium) which is heated, expanded, cooled, and compressed in working cycles in known manner.

The left-hand half of the engine comprises the cylinders 5 to 8 and the regenerator-cooler units 13 to 16 and is complementary to the right-hand half and needs no further explanation.

The pipes interconnecting the tops of the cylinders and the regenerator-cooler units are heated by burner units mounted in combustion chambers, two of which are shown in FIG. 1 and designated by 26 and 27. Air for the combustion in the chamber 26 is introduced through a space 28 between double walls surrounding the upper part of the engine. The air is fed to the top of a heat-exchanger 29 centrally mounted between the combustion chambers 26 and 27. The pre-heated air leaves the lower part of the heat-exchanger and is fed to the combustion chamber 26 the flow of air being indicated by arrows shown in full lines.

The combustion gases will pass between the systems of horizontally-extending pipes, where they will give off some of their heat. The exhaust gases are then fed to the bottom of the heat-exchanger 29 and they will leave the top of the heat-exchanger 29 to a duct or flue 30, the flow being indicated by dotted arrows.

The combustion chamber 27 is fed with pre-heated air following paths similarly indicated and the exhaust gases will flow to a flue 31 in a manner basically similar to that described above.

It will be understood that, in spite of the W-configuration of the engine shown, the width of the engine is comparatively small because the space between the combustion chambers accommodates the pre-heater and the exhaust gas flues. Also the heat tending to radiate from the tops of the engine cylinders will be absorbed by the cold combustion air passing to the pre-heater.

The engines shown in FIGS. 3 and 4 differ from the embodiment shown in FIG. 1 mainly in that the heat-exchanger is V-shaped.

The heat-exchanger shown in FIG. 3 is provided with an air inlet opening 40 at the outer side of the top of each half of the heat-exchanger. The heated air will leave the exchanger at side openings 41 at the bottom of the exchanger. Combustion gases from the chambers 26 and 27 are passed through each of the exchanger halves as shown in dotted lines. Having passed the heat-exchanger, the exhaust gases will pass to a central duct or flue 42.

The embodiment of FIG. 4 is provided with a heat-exchanger which also is composed of two halves arranged as limbs of a V. Air is introduced at the top of each limb through openings 50, and withdrawn at the bottom through side openings 51. Exhaust gas is introduced into the exchanger through bottom openings 52, and is withdrawn through side openings 53 at the top of the heat-exchanger. According to this embodiment the gases leave the engine through a single centrally mounted duct or flue 54.

As can be seen, in each of the illustrated engines there are two rows of cylinders disposed in a V as viewed in a plane section perpendicular to the axis of the crank-shaft, and the combustion chambers are provided with downwardly directed fuel injection, and there are ducts for delivering air to the heat-exchanger through a path extending upwardly along the sides of the engine and towards the center of the engine along the top surface thereof. In the engine of FIGS. 1 and 2 each of the two ducts 30 and 31 for withdrawing combustion gases from the heat-exchanger extends parallel to the direction of the axis of the engine crank-shaft and is located between the heat-exchanger and an adjacent burner unit. In each of the engines of FIGS. 3 and 4 a single duct for withdrawing exhaust gases from the heat-exchanger extends parallel to the axis of the crank-shaft and is located between two heat-exchanging elements.

What is claimed is:

1. A multi-cylinder hot gas Stirling cycle engine having at least two combustion chambers external to the cylinders of the kind affording increasing dimensions in the direction away from the point of fuel injection, said two chambers for corresponding ones of said cylinders located with a common passageway therebetween, a heat exchanger positioned in said passageway, and structure surrounding said cylinders passing combustion air for said external combustion chambers through said heat exchanger and for passing exhaust gases from said two external combustion chambers through said exchanger in a heat-exchanger relationship to pre-heat said combustion air with said exhaust gases.

2. An engine according to claim 1, in which at least two rows of cylinders are disposed in a V as viewed in a plan section perpendicular to the axis of the crank-shaft, and the combustion chambers are provided with downwardly directed fuel injection.

3. An engine according to claim 1, characterized in that it is provided with ducts for delivering air to the heat exchanger through a path extending upwardly along the sides of the engine and towards the center of the engine along the top surface thereof.

4. An engine according to claim 3, characterized in that each of two ducts for withdrawing combustion gases from the heat-exchanger extends parallel to the direction of the axis of the engine crank-shaft and is located between the heat-exchanger and an adjacent burner unit.

5. An engine according to claim 3, having two heat exchange elements characterized in that a single duct for withdrawing exhaust gases from the heat-exchanger extends parallel to the axis of the crank-shaft and is located between said two heat-exchanging elements.

* * * * *